US011047062B2

(12) United States Patent
Horie et al.

(10) Patent No.: US 11,047,062 B2
(45) Date of Patent: Jun. 29, 2021

(54) HEAT INSULATION COAT, COATED MEMBER, AND METHOD OF MANUFACTURING COATED MEMBER

(71) Applicant: TOYOTA JIDOSHA KABUSHIKI KAISHA, Toyota (JP)

(72) Inventors: Toshio Horie, Nagakute (JP); Fumio Shimizu, Nagakute (JP); Kenji Fukui, Nagakute (JP); Naoki Nishikawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/801,736

(22) Filed: Feb. 26, 2020

(65) Prior Publication Data

US 2020/0370195 A1 Nov. 26, 2020

(30) Foreign Application Priority Data

May 24, 2019 (JP) ............................ JP2019-097232

(51) Int. Cl.
*B32B 18/00* (2006.01)
*C23C 4/18* (2006.01)
(Continued)

(52) U.S. Cl.
CPC .............. *C25D 11/16* (2013.01); *C23C 4/067* (2016.01); *C23C 4/18* (2013.01); *F02B 77/11* (2013.01)

(58) Field of Classification Search
CPC .............. B32B 18/00; B32B 2307/202; B32B 2307/304; B32B 2307/554; B32B 2605/00; C23C 18/1216; C23C 4/04
See application file for complete search history.

(56) References Cited

U.S. PATENT DOCUMENTS 4,269,903 A * 5/1981 Clingman ............ F01D 11/122 428/591
5,955,182 A * 9/1999 Yasuda .................. C23C 28/34 428/217
(Continued)

FOREIGN PATENT DOCUMENTS

JP 2016-125082 A 7/2016
JP 2016-216763 A 12/2016
(Continued)

*Primary Examiner* — Long T Tran
(74) *Attorney, Agent, or Firm* — Dickinson Wright, PLLC

(57) ABSTRACT

[Technical Problem] An object is to provide a heat insulation coat having a novel form/structure different from conventional ones.

[Solution to Problem] The present invention provides a heat insulation coat having a spongy body that is composed of non-linear pores and a skeleton incorporating the pores. The skeleton is an amorphous body comprising Al, Si, O, and impurities and has an amorphous peak specified by X-ray diffraction analysis at a position of 3.5 Å or more as the lattice spacing. The heat insulation coat has an apparent density of 1 g/cm$^3$ or less, a volumetric specific heat of 1,000 kJ/m$^3$·K or less, and a thermal conductivity of 2 W/m·K or less. The spongy body is obtained through forming a base layer, such as by thermal-spraying an aluminum alloy that contains a large amount of Si, and performing an anodizing process by AC/DC superimposition energization on the base layer. The amount of Si in the base layer may be, for example, 16 to 48 mass % with respect to the alloy as a whole. The heat insulation coat of the present invention is excellent in the swing characteristics and may be provided on the inner wall surface of a combustion chamber of an internal combustion engine.

7 Claims, 2 Drawing Sheets

Sample 2

Sample C1

(51) Int. Cl.

| | |
|---|---|
| ***C25D 11/16*** | (2006.01) |
| ***C23C 4/067*** | (2016.01) |
| ***F02B 77/11*** | (2006.01) |

(56) References Cited

U.S. PATENT DOCUMENTS

| | | | | |
|---|---|---|---|---|
| 10,385,772 | B2 | 8/2019 | Takagishi et al. | |
| 2011/0020552 | A1* | 1/2011 | Seid | C23C 28/02<br>427/331 |
| 2014/0072836 | A1* | 3/2014 | Mills | H01M 4/94<br>429/8 |
| 2014/0293554 | A1* | 10/2014 | Shashkov | C25D 13/02<br>361/748 |
| 2017/0167373 | A1 | 6/2017 | Hong et al. | |

FOREIGN PATENT DOCUMENTS

| | | | |
|---|---|---|---|
| JP | 2017014597 | A | 1/2017 |
| JP | 2017214603 | A | 12/2017 |

* cited by examiner

Sample 2

Sample C1

HEAT INSULATION COAT, COATED MEMBER, AND METHOD OF MANUFACTURING COATED MEMBER

RELATED APPLICATION

This application claims priority to Japanese Patent Application No. 2019-097232, filed on May 24, 2019, including the specification, drawings and abstract, the entire disclosure of which is incorporated herein by reference.

TECHNICAL FIELD

The present invention relates to a heat insulation coat and relevant techniques.

BACKGROUND ART

To improve the thermal efficiency of internal combustion engines and other similar machines, various proposals have been made for heat insulation coats having low thermal conductivity (high heat insulation properties) and low heat capacity (high temperature followability) (heat insulation coats excellent in so-called "swing characteristics"). Such heat insulation coats are described in the following documents.

PRIOR ART DOCUMENTS

Patent Documents

[Patent Document 1] JP2016-125082A
[Patent Document 2] JP2016-216763A
[Patent Document 3] JP2017-14597A
[Patent Document 4] JP2017-214603A
[Patent Document 5] US2017/0167373A

SUMMARY OF INVENTION

Technical Problem

Patent Documents 1 to 4 propose heat insulation coats in which micro-sized pores (voids) are dispersed in anodized coats. These anodized coats themselves are composed of porous layers having linear tubular fine holes extending in one direction, and such porous layers are well-known forms.

Patent Document 5 proposes a heat insulation coat using silica aerogel, but does not describe a heat insulation coat composed of an aluminum-based oxide.

The present invention has been made in view of such circumstances and an object of the present invention is to provide a heat insulation coat having a novel structure or form different from those of conventional heat insulation coats and relevant techniques.

Solution to Problem

As a result of intensive studies to achieve the above object, the present inventors have successfully obtained a heat insulation coat of low heat capacity and low thermal conductivity having a form and/or structure different from those of conventional anodized coats by anodizing an aluminum alloy (simply referred to as an "Al alloy") in which Si is solid-solved in a supersaturated state. Developing this achievement, the present inventors have accomplished the present invention, which will be described below.

«Heat Insulation Coat»

The present invention provides a heat insulation coat having a spongy body. The spongy body comprises non-linear pores and a skeleton incorporating the pores. The skeleton is an amorphous body comprising Al, Si, O, and impurities and has an amorphous peak specified by X-ray diffraction analysis at a position of 3.5 Å or more as the lattice spacing. The heat insulation coat has an apparent density of 1 g/cm$^3$ or less, a volumetric specific heat of 1,000 kJ/m$^3$·K or less, and a thermal conductivity of 2 W/m·K or less.

The heat insulation coat of the present invention has a spongy body having a form that is obviously different from those of conventional anodized coats. The heat insulation coat composed of the spongy body has a low density, a low heat capacity, and a low thermal conductivity and exhibits excellent heat insulation properties.

«Coated Member»

The present invention can also be perceived as a member coated with the heat insulation coat. For example, the present invention may be perceived as a coated member in which at least part of a main body surface is coated with the above-described heat insulation coat.

«Method of Manufacturing Coated Member»

The present invention can also be perceived as a method of manufacturing the coated member. For example, the present invention may be perceived as a method of manufacturing a coated member, comprising a first step of forming a base layer of an aluminum alloy on a main body surface and a second step of anodizing the base layer, wherein the above-described coated member is obtained.

«Others»

(1) Unless otherwise stated in the present specification, an object (member) to be formed with the heat insulation coat is referred to as a "main body," and an object (e.g., a portion composed of a high Si-containing Al alloy) to be anodized when forming the heat insulation coat is referred to as a "base layer" or a "base material."

When the heat insulation coat is composed only of a spongy body, the physical property values (density, specific heat, thermal conductivity, etc.) as referred to in the present specification are not only the physical property values of the heat insulation coat but also the physical property values of the spongy body.

(2) Unless otherwise stated, a numerical range "x to y" as referred to in the present specification includes the lower limit x and the upper limit y. Any numerical value included in various numerical values or numerical ranges described in the present specification may be selected or extracted as a new lower or upper limit, and any numerical range such as "a to b" can thereby be newly provided using such a new lower or upper limit. Unless otherwise stated, "x to y nm" as referred to in the present specification means x nm to y nm. The same applies to other unit systems (μm, kJ/m$^3$·K, etc).

EMBODIMENTS FOR CARRYING OUT THE INVENTION

Figure 1:
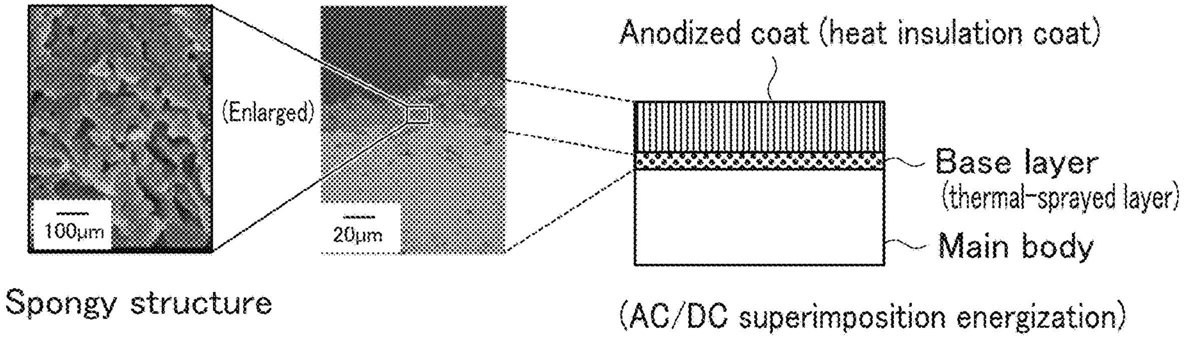
FIG. 1 depicts a set of SEM images etc. and a diagram showing the structure of an anodized coat of Sample 2 and a set of SEM images etc. and a diagram showing the structure of an anodized coat of Sample C1.
Figure 1:
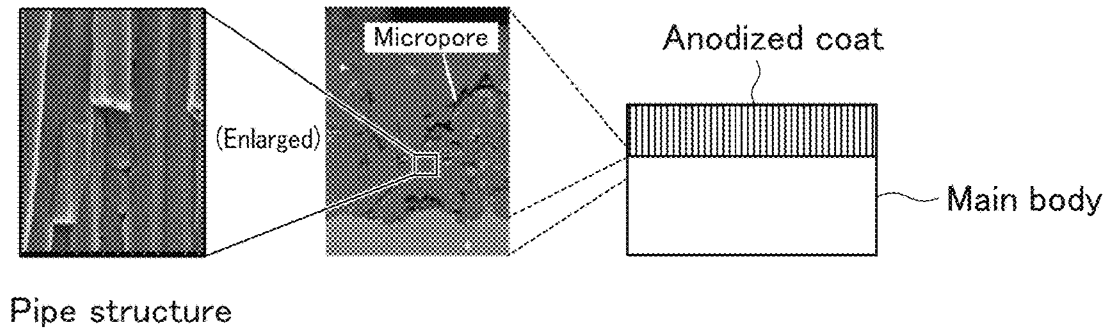

The content described in the present specification can be applied not only to the heat insulation coat but also to the coated member and methods of manufacturing them. One or more features freely selected from the present specification can be added to the above-described features of the present invention. Features regarding a method can also be features regarding a product. Which embodiment is the best or not is different in accordance with objectives, required performance, and other factors.

«Spongy Body»

The spongy body (sponge-like porous body) which constitutes the heat insulation coat is composed of a skeleton and pores (voids) formed in the skeleton. Its form is nonlinear, formless, irregular, or disorganized. Thus, the form of the spongy body is completely different from that of a conventional anodized coat (alumite coat) composed of a porous layer in which linear tubular bodies are regularly arranged. If the conventional anodized coat is called a pipe structure, it can be said that the spongy body or anodized coat according to the present invention has a spongy structure.

(1) The skeleton of the spongy body is composed of Al, Si, O, and impurities. Si is almost not present at least as micro-sized particles (maximum length is 1 μm to 1 mm) in the skeleton. While Si is considered to be solid-solved in Al-based oxide that constitutes the skeleton or present as an Al—Si-based oxide, the details are not sure. However, the skeleton of the spongy body is certainly different from the alumite ($Al_2O_3$) which constitutes a conventional anodized coat.

The skeleton of the spongy body is composed of an amorphous body. The skeleton having an amorphous structure can be found from the fact that the profile (pattern) of X-ray diffraction analysis (XRD) is broad. The amorphous peak on the profile is located at a position different from that of the alumite which constitutes a conventional anodized coat. Specifically, the amorphous peak of the skeleton of the spongy body appears at a position of 3.5 Å or more as the lattice spacing. This is shifted in the direction in which the lattice spacing increases (direction in which the diffraction angle 2θ decreases) with respect to a lattice spacing of 3.4 Å of the alumite. Also from this, it can be found that the skeleton which constitutes the spongy body is composed of a compound having a structure different from that of the conventional alumite.

The lattice spacing of the amorphous peak increases as the amount of Si contained in the skeleton of the spongy body increases, and is 3.6 Å or more in an embodiment or 3.7 Å or more in another embodiment. However, suffice it to say that the lattice spacing of the amorphous peak is 4.1 Å or less in an embodiment or 4 Å or less in another embodiment because Si is usually less than Al (less than 50 mass % or less than 50 at %).

(2) As described above, the pores of the spongy body are irregular in the form and are not limited to closed holes. It is therefore not easy to define or specify the size and other parameters. However, when the cross section along the extending direction of the spongy body (thickness direction of the heat insulation coat) is observed with an electron microscope (such as SEM), the form of the spongy body is completely different from the form of the conventional porous layer (see FIG. 1). On the cross section, clear pores are observed in the spongy body. However, in the conventional porous layer, usually, voids are only observed on the cross section in a direction perpendicular to the coat thickness direction, and pores as in the spongy body are not observed on the cross section in the coat thickness direction.

«Heat Insulation Coat»

The spongy body or the heat insulation coat composed of the spongy body has low density, low specific heat, and low thermal conductivity. These will be described below in sequence.

(1) Density

The apparent density (bulk density) of the heat insulation coat is, for example, 0.3 to 1 g/cm$^3$ in an embodiment or 0.5 to 0.8 g/cm$^3$ in another embodiment. On the other hand, the hard alumite (JIS H 8603 Type 3) which constitutes the conventional anodized coat has an apparent density of about 1.9 g/cm$^3$. The heat insulation coat composed of the spongy body involves more pores and can have a lower density than the conventional anodized coat.

The apparent density (simply referred to as "density") of the heat insulation coat (spongy body) is obtained as follows. The mass (W1) of a coated member in which the heat insulation coat is formed on the main body is measured. Then, the heat insulation coat is wiped after being impregnated with paraffin. The volume (V1) of the coated member in which the pores of the spongy body are thus sealed is measured by the Archimedes method. Thereafter, only the heat insulation coat is removed using a mixed acid of sulfuric acid and chromic acid. The mass (Wal) and volume (Val) of only the remaining main body are measured in the same manner. From these, the mass (W) and volume (V) of the heat insulation coat (spongy body) are determined, and the density (ρ) is obtained as $\rho=W/V=(W1-Wal)/(V1-Val)$.

The thickness (t) of the heat insulation coat is obtained as $t=(W/\rho)/S=(V1-Val)/S$ using a coating area (S) of the heat insulation coat.

The heat insulation coat composed of the spongy body may preferably have a porosity ratio of 70% or more in an embodiment, 75% or more in another embodiment, or 80% or more in a further embodiment. The porosity ratio is obtained from the true density ($\rho o$=4.1 g/cm$^3$) and apparent density (ρ) of aluminum oxide ($Al_2O_3$) (i.e., the porosity ratio=$\{1-\rho/\rho o\}\times100\%$). The porosity ratio of the conventional anodized coat (alumite) is about 50% to 55%.

(2) Specific Heat

The volumetric specific heat (volume specific heat) of the heat insulation coat is, for example, 100 to 1,000 kJ/m$^3$·K in an embodiment or 500 to 800 kJ/m$^3$·K in another embodiment. The volumetric specific heat of the previously described hard alumite is about 2,000 kJ/m$^3$·K.

The volumetric specific heat (simply referred to as "specific heat") of the heat insulation coat (spongy body) is obtained using a differential scanning calorimeter (DSC). There are two types of DSCs: a heat flux-type DSC and an input compensation-type DSC. For example, the former may preferably be used. The measurement sample is, for example, a substance (powder) that is mechanically peeled off from the heat insulation coat (spongy body) formed on the main body. The volume of a sample is obtained from the mass of the sample and the previously described density.

(3) Thermal Conductivity

The thermal conductivity of the heat insulation coat is, for example, 0.1 to 2 W/m·K in an embodiment or 0.5 to 1.5 W/m·K in another embodiment. The thermal conductivity of the previously described hard alumite is about 2 W/m·K.

The thermal conductivity of the heat insulation coat (spongy body) is obtained as follows. The thermal diffusivity of the main body alone and the thermal diffusivity of a coated member in which the heat insulation coat is formed on the main body are measured using the laser flash method. On the basis of these thermal diffusivities, the density and thickness of the main body, and the thickness and density of the heat insulation coat in the coated member, the thermal conductivity of the heat insulation coat (spongy body) is calculated. The thickness (t) and density (ρ) of the heat insulation coat are obtained using the above-described methods.

«Coat Formation»

The heat insulation coat composed of the spongy body is formed, for example, using an anodizing process for an Al alloy. The Al alloy as the base material may preferably contain, for example, Si of a hypereutectic composition or more, specifically, 16 to 48 mass % of Si in an embodiment or 18 to 44 mass % of Si in another embodiment with respect to the Al alloy as a whole. The Al alloy may be a binary alloy of Si and Al (containing Si and the balance of Al and impurities) or may contain other elements. Examples of such elements include Cu, Mg, P, Ti, B, Sr, Na, Sb, Zn, Fe, Mn, Ni, Pb, Sn, and Cr.

(1) First Step/Base Layer (Base Material) Formation Step

An Al alloy that contains a large amount of Si may often have a metal structure in which micro-sized Si particles (e.g., the maximum length is 1 to 1,000 μm in an embodiment or 50 to 600 μm in another embodiment) (primary crystal Si particles, eutectic Si particles, etc.) are crystallized or precipitated. If such an Al alloy is anodized, a conventional anodized coat (pipe structure) is formed and coarse pores (voids) appear around the Si particles which are not anodized. That is, the spongy body as in the present invention is not formed.

When forming a spongy body composed of an anodic oxide, an anodizing process may preferably be performed on a base material (base layer) composed of an aluminum alloy in which Si is solid-solved in a supersaturated state. Such a base material can be formed, for example, by thermal spraying, metal deposition (weld overlay), or similar technique. Examples of the thermal spraying include (high-speed) flame spraying, arc spraying, plasma spraying, and laser spraying. Examples of the metal deposition include a laser beam heat source scheme and an arc discharge scheme. Among these, laser metal deposition (LMD) using a metal powder as the raw material powder is preferred for the same reason.

The raw material powder for use may preferably be, for example, an atomized powder of an Al—Si-based alloy. This allows the base material (base layer) to be readily formed in which uneven distribution of Al and Si as the main components is suppressed.

(2) Second Step/Anodizing Step

The anodizing process for the above-described base material (base layer) may preferably be performed by an electrolytic step of performing AC/DC superimposition energization in which an AC component and a DC component are superimposed. This allows the spongy body to be efficiently formed even for an Al alloy that contains a large amount of Si.

In this operation, it may be preferred to set the minimum voltage to −5 to 5 V in an embodiment or −2 to 2 V in another embodiment, for example, or set the minimum current density to −0.4 to 0.4 A/$cm^2$ in an embodiment or −0.2 to 0.2 A/$cm^2$ in another embodiment. From another aspect, it may be preferred to set the maximum voltage (peak voltage) to 30 to 200 V in an embodiment or 35 to 180 V in another embodiment, for example, or set the maximum current density to 1 A/$cm^2$ or more in an embodiment, 1.5 A/$cm^2$ or more in another embodiment, or 1.8 A/$cm^2$ or more in a further embodiment. The frequency of the AC current may preferably be set, for example, to 2 Hz to 9 kHz in an embodiment, 10 Hz to 1 kHz in another embodiment, or 20 to 200 Hz in a further embodiment. The maximum voltage, maximum current density, and other parameters may be changed (in particular, increased) during the process.

The AC current waveform may be a sine wave, a rectangular wave, a triangular wave, a saw-tooth wave, a pulse wave, or other appropriate wave. The AC component may preferably have a constant frequency and a constant peak value (minimum value or maximum value), for example, and the DC component may preferably have a constant voltage or a constant current, for example.

The electrolytic solution (solution for the anodizing process) may be, for example, an inorganic acid solution such as a sulfuric acid aqueous solution, a phosphoric acid aqueous solution, or a chromic acid aqueous solution or may also be an organic acid solution such as an oxalic acid aqueous solution. The concentration of the sulfuric acid aqueous solution is, for example, about 5 to 40 mass % in an embodiment or about 10 to 30 mass % in another embodiment. The temperature of the electrolytic solution (bath temperature) is, for example, about 0° C. to 40° C. in an embodiment or about 10° C. to 30° C. in another embodiment. The counter electrode is usually a platinum electrode, a graphite electrode, or other similar electrode.

After the anodizing process, one or more subsequent processes may be performed, such as a pore sealing process, a sealing process, a heating process, and painting. The pore sealing process is performed, for example, by exposing the object to boiling water and/or high-pressure steam. The sealing process is performed, for example, through applying an appropriate compound such as polysilazane or polysiloxane to the surface of the heat insulation coat (spongy body) and converting the compound into silica by burning.

«Coated Member»

The material, form, and other properties of the main body to be provided with the heat insulation coat are not limited. The main body may be made of an Al alloy, an Fe-based alloy (such as iron steel or cast iron), or a ceramic, provided that the base layer to be the base of the spongy body can be formed.

The main body is, for example, a member that constitutes a combustion chamber of an internal combustion engine. The internal combustion engine is, for example, a reciprocating engine, a rotary engine, a gas turbine engine, a jet engine, or other similar engine. The reciprocating engine may be any of a gasoline engine, a diesel engine, a 4-cycle engine, a 2-cycle engine, and the like. In the case of a reciprocating engine, the inner wall surfaces of a combustion chamber are formed by a piston, a cylinder head, a cylinder (sleeve), valves, and other necessary components, while in the case of a rotary engine, the inner wall surfaces of a combustion chamber are formed by a rotor, a rotor housing, and other necessary components. The heat insulation coat may preferably be provided on at least part of the inner wall surfaces (heat receiving surfaces) of a combustion chamber. Specifically, the heat insulation coat may preferably be provided, for example, on the top surface (crown surface) of a piston, the side peripheral surface of a top land, the combustion chamber surface of a cylinder head (including the inner surface of a sub chamber), the top dead center side peripheral surface of a cylinder, the valve head back surface of a valve, or the like. The thickness of such a heat insulation coat is, for example, 20 to 150 μm in an embodiment or 40 to 80 μm in another embodiment.

Examples

A number of samples (coated members) were produced by coating the surfaces of main bodies (members) with the heat insulation coats through the anodizing process, and the form, structure, features, and other properties of the coat of each sample were revealed. The present invention will be described in more detail below with reference to such specific examples.

«Manufacturing of Samples»

(1) Main Bodies

A number of main bodies (20×40×2 mm) composed of an aluminum alloy for casting (JIS AC8A/Al-12% Si-1% Cu-1% Mg) were prepared as objects to be coated.

(2) Thermal Spraying Step (Base Layer Formation Step/First Step)

A base layer (thermal-sprayed layer) was formed on the surface of each main body by thermal-spraying an alloy powder having the composition listed in Table 1. Gas atomized powders (median diameter $D_{50}$: 10 to 40 μm) were used as the alloy powders. Thermal spraying was performed using a plasma thermal spraying apparatus. At that time, the current and voltage were set to 450 A and 27.5 kV, respectively.

Thus, test pieces (Samples 1 and 2) were prepared in each of which one surface of the main body was coated with a base layer (thickness of 60 μm) having a different amount of Si. As a comparative example, a test piece that was not thermal-sprayed and remained as a main body was also prepared (Sample C1).

(3) Anodizing Step (Electrolytic Step/Second Step)

The surface to be anodized (base layer) of a test piece was immersed in a sulfuric acid aqueous solution (electrolytic solution), and energization was performed with the test piece as the anode and a platinum electrode as the cathode. For this operation, other surfaces of the test piece than the surface to be anodized were masked so that the energization would be performed between the surface to be anodized and the platinum electrode. The electrolytic solution had a sulfuric acid concentration of 20 mass % and the temperature (bath temperature) was 10° C. The energization was performed while stirring the electrolytic solution.

The test pieces (Samples 1 and 2) provided with the base layers were subjected to AC/DC superimposition energization. This AC/DC superposition energization was performed by voltage control in which an AC current (frequency: 1 KHz/constant) having a voltage waveform of sine wave was superimposed on a DC current having a constant voltage. In this operation, the minimum voltage was set to 0 V, and the maximum voltage (peak voltage) was gradually increased. First, electrolysis was performed at an initial maximum voltage of 40 V for 5 minutes. Subsequently, only the maximum voltage was increased by 20 V and electrolysis was further performed for 5 minutes (maximum voltage 60 V×5 minutes). This operation was repeated at intervals of 5 minutes, and the electrolysis was completed at a maximum voltage of 180 V for 5 minutes. Thus, the maximum voltage was raised in 8 steps, and the AC/DC superposition electrolysis was performed for a total of 40 minutes.

The test piece (Sample C1) provided with no base layer was also subjected to AC/DC superimposition energization. This AC/DC superposition energization was also performed by voltage control for 8 minutes with an average voltage of 500 V and a frequency of 20 Hz.

The test pieces after completion of the electrolysis were well washed with distilled water after being taken out from the electrolytic solution. Thereafter, compressed air was blown to remove moisture and then the test pieces were sufficiently dried in the air. Thus, samples were obtained in which the main body surfaces were coated with various anodized coats.

«Observation/Analysis of Samples»

(1) An approximately central region of the longitudinal section (cross section cut in the thickness direction) of the anodized film of each sample was observed with a field emission scanning electron microscope (FE-SEM). As an example, SEM images and diagrams of Sample 2 and Sample C1 are shown and illustrated in FIG. 1.

Figure 2:
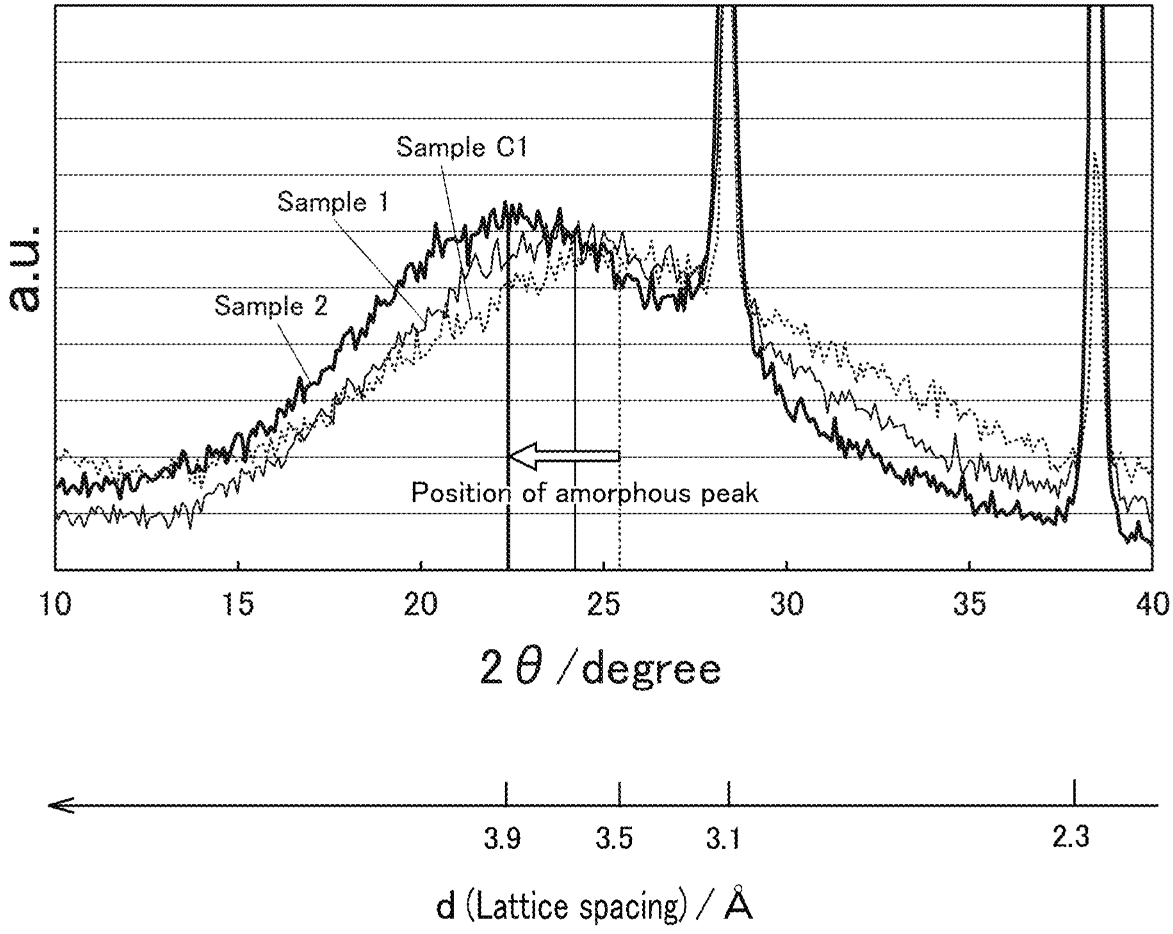
FIG. 2 depicts XRD profiles of anodized coats of samples.

(2) The crystal structure of the anodized coat (cross section) of each sample was analyzed with an X-ray diffractometer (available from Rigaku Corporation). X-ray used was Cu-Kα ray and 2θ was set to 10° to 40°. The profiles thus obtained of samples are collectively illustrated in FIG. 2. In FIG. 2, along with the diffraction angle (2θ), the (lattice) spacing calculated from the Bragg's law is also illustrated along the horizontal axis.

In the region in which the profile is broad, the position giving the maximum detection intensity (a.u.) is defined as an "amorphous peak position." The amorphous peak position of each sample is also listed in Table 1 as the lattice spacing. In the profiles illustrated in FIG. 2, peaks around 2θ=28° and 38° indicate Si and Al mixed during the production of the samples.

«Measurement of Samples»

The apparent density, porosity ratio, volumetric specific heat, thermal conductivity, and thickness of the anodized coat of each sample were measured using the previously described methods. Results are summarized and listed in Table 1.

«Evaluation»

(1) Coat Structure

As apparent from FIG. 1, it has been found that the anodized coats (Samples 1 and 2) formed by the AC/DC superimposition energization on the thermal-sprayed layers (base layers) with a large amount of Si have spongy structures (spongy bodies). It has been revealed that the anodized coats having such a form are greatly different from the conventional anodized coat (Sample C1) composed of a linear tubular porous layer. Absence of macro-sized Si particles in the thermal-sprayed layers before the anodizing process was separately confirmed by SEM or the like.

As apparent from FIG. 2, it has been confirmed that any anodized coat is composed of an amorphous structure (amorphous body). However, the position of the amorphous peak is different for each sample. That is, in the anodized coats (Samples 1 and 2) composed of spongy bodies, the amorphous peak is shifted in the direction in which the lattice spacing increases (direction in which the diffraction angle decreases), as compared with the conventional anodized coat (Sample C1) composed of a linear tubular porous layer.

(2) Coat Characteristics

As apparent from Table 1, the anodized coats of Samples 1 and 2 have lower density, lower specific heat, and lower thermal conductivity than those of the anodized coat of Sample C1. That is, it has been found that the anodized coats of Samples 1 and 2 are heat insulation coats having excellent swing characteristics.

It has also been confirmed that the anodized coats of Samples 1 and 2 can be formed sufficiently thick even when the processing time is short.

From the above, it has been found that the heat insulation coat of the present invention has a form and/or structure that are obviously different from those of the conventional anodized coats and has excellent characteristics such as the low heat capacity (specific heat) and low thermal conductivity. It has also been found that the thickness of the heat insulation coat can be increased in a short time and the productivity is thus excellent.

TABLE 1

| Sample No. | Composition of base layer (mass %) | Spongy body Lattice spacing corresponding to amorphous peak of skeleton (Å) | Coat characteristics Apparent density ($g/cm^3$) | Porosity ratio (%) | Volumetric specific heat ($kJ/m^3 \cdot K$) | Thermal conductivity ($W/m \cdot K$) | Thickness (μm) |
|---|---|---|---|---|---|---|---|
| 1 | Al—20%Si | 3.65 | 0.84 | 80 | 0.76 | 1.15 | 47 |
| 2 | Al—40%Si | 3.87 | 0.74 | 82 | 0.66 | 0.32 | 51 |

The invention claimed is:

1. A heat insulation coat having a spongy body, the spongy body comprising non-linear pores and a skeleton incorporating the pores, wherein the spongy body comprises an anodic oxide of an aluminum alloy in which Si is solid-solved in a supersaturated state, and the aluminum alloy contains 16 to 48 mass % of Si with respect to the alloy as a whole;

the skeleton is an amorphous body comprising Al, Si, O, and impurities and has an amorphous peak specified by X-ray diffraction analysis at a position of 3.5 Å or more and 4.1 Å or less as lattice spacing, and the heat insulation coat has an apparent density of 1 $g/cm^3$ or less, a volumetric specific heat of 1,000 $kJ/m^3 \cdot K$ or less, and a thermal conductivity of 2 $W/m \cdot K$ or less.

2. The heat insulation coat according to claim 1, wherein a porosity ratio is 70% or more.

3. A coated member wherein at least part of a main body surface is coated with the heat insulation coat according to claim 1.

4. The coated member according to claim 3, wherein the main body surface is an inner wall surface of a combustion chamber, and the heat insulation coat has a thickness of 20 to 150 μm.

5. A method of manufacturing a coated member, comprising:

a first step of forming a base layer of an aluminum alloy on a main body surface; and a second step of anodizing the base layer, wherein the coated member according to claim 3 is obtained.

6. The method of manufacturing a coated member according to claim 5, wherein the first step is a thermal spraying step for the aluminum alloy.

7. The method of manufacturing a coated member according to claim 5, wherein the second step is an electrolytic step of performing AC/DC superimposition energization in which an AC component and a DC component are superimposed.

* * * * *